May 18, 1937.  F. W. HINTZ  2,080,888

RIDGE BREAKER

Filed April 21, 1936

INVENTOR
F. W. Hintz
BY
ATTORNEY

Patented May 18, 1937

2,080,888

UNITED STATES PATENT OFFICE 2,080,888

RIDGE BREAKER

Fred W. Hintz, Lodi, Calif.

Application April 21, 1936, Serial No. 75,567

3 Claims. (Cl. 280—160)

This invention relates generally to agricultural implements and is directed in particular to a ridge breaker for attachment to a tractor of the crawler type.

For irrigation purposes, the ground especially in orchards and vineyards is checked forming ridges and shallow ditches adjacent thereto. In such instances, it is necessary to provide the tractor which draws the ground working implements with an attachment known as a ridge breaker and which attachment is mounted on the tractor so as to cut thru the ridge and push the resultant loose earth into the adjacent ditch in advance of the crawler mechanism of the tractor. Unless a ridge breaker is employed the tractor must climb up over each ridge and ditch which causes the tractor motor to intermittently slow up and then race unless a governor is used on the motor.

It is the object of my invention to provide a ridge breaker which will effectively cut thru each ridge and push the earth into the adjacent ditch; and to also provide a ridge breaker which will not be operative when the tractor is moved in a reversed direction thereby preventing the ridge breaker from digging into the ground as occurs with some ridge breakers when the tractor moves in such direction.

An additional object of my invention is to provide a ridge breaker which may be adjusted vertically relative to the ground level; and to provide a selectively controlled locking means to hold the ridge breaker plate in a horizontal inoperative position regardless of its adjusted position relative to the ground when in a vertical operative position.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
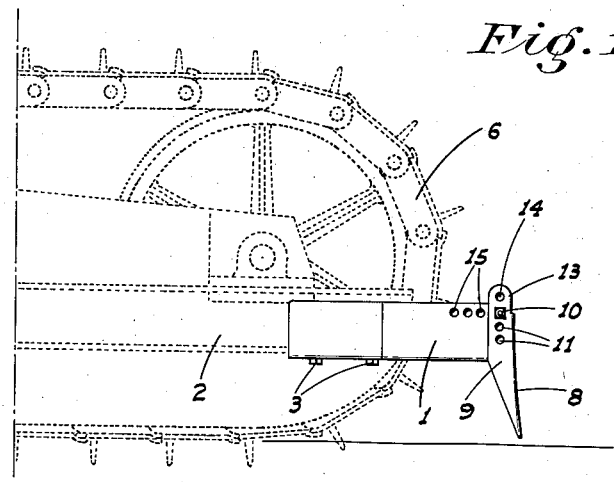
Figure 1 is a side elevation of my improved ridge breaker as mounted on a crawler type tractor.
Figure 2:
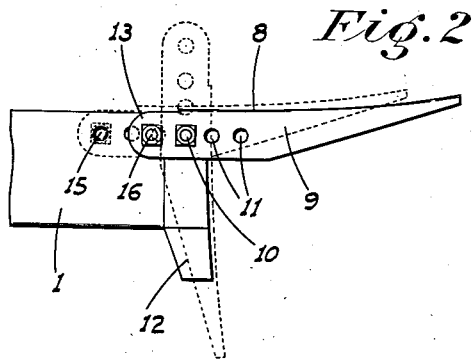
Figure 2 is a fragmentary side elevation of the device detached from the tractor and with the breaker plate locked in a horizontal inoperative position.
Figure 3:
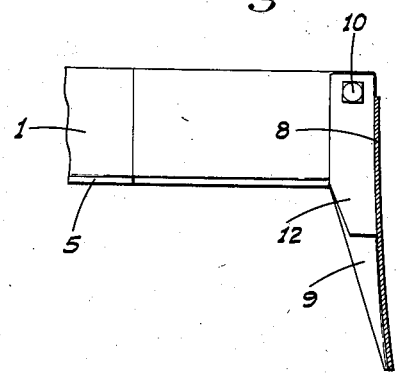
Figure 3 is a fragmentary sectional elevation of the device detached from the tractor and with the breaker plate in an operative position.
Figure 4:
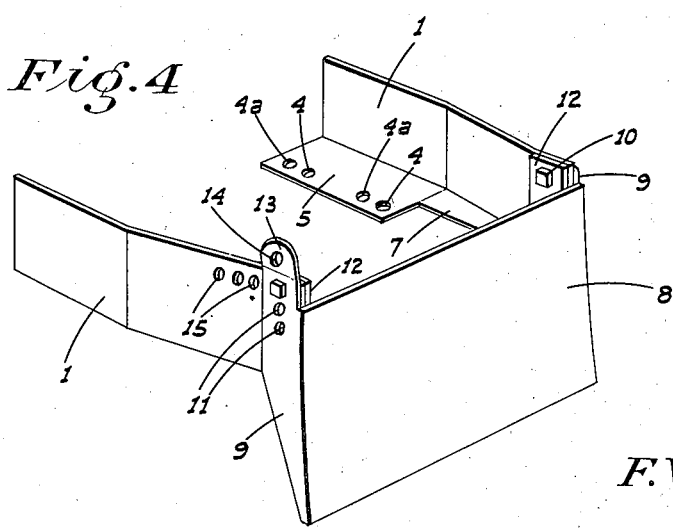
Figure 4 is a perspective view of the device detached from the tractor.

Referring now more particularly to the characters of reference on the drawing, the numeral 1 indicates a pair of spaced angle shaped arms mounted adjacent their rear ends on the forward portion of the tractor track supporting frame 2 by means of bolts 3 projecting thru holes 4 in the bottom flange 5 of the arms into the frame. These arms are thus mounted on opposite sides of the track supporting frame and project forward in face to face relation beyond the front end of the endless track 6.

The bottom flange 5 of the arms is also provided with other bolt holes 4a to the rear of holes 4 in order that the forward projection of the arms may be lengthened if desired. The forward portion of the bottom flange 5 is reduced in width as the 7 in order to assure proper clearance between the same and the track links.

A ridge breaker plate 8 having a slightly curved face is formed with rearwardly extending flanges 9 down the sides; said flanges being disposed outwardly of the forward ends of arms 1 and pivoted thereto by means of bolts 10 projecting thru holes 11 in the flanges. Each flange is formed with a row of these holes 11 disposed substantially parallel to plate 8 in order that said plate may be adjusted vertically by merely withdrawing bolts 10 and reinserting them in the selected corresponding holes.

In order to strengthen the forward ends of arms 1 and to prevent the plate from buckling back, fingers or stops 12 are secured to the arms immediately adjacent said forward ends thereof. These stops 12 extend below the arms somewhat and are curved along their forward edges, as are the forward edges of the arms, to conform to the curvature of the rear face of plate 8 so as to bear evenly against the same.

One of the flanges 9 is formed with an upstanding ear 13 provided with a hole 14 therein. The corresponding arm 1 is provided with a substantially horizontal row of holes 15 so arranged relative to holes 11 that when the ridge breaker plate is raised to a horizontal position, the hole 14 in ear 13 will register with one of the holes 15 regardless of the vertical adjustment of the ridge breaker plate. A bolt 16 is provided to lock the ear to the arm when the ridge breaker plate is horizontal and hole 14 and one of holes 15 are in register.

In use, a ridge breaking device as above described, is mounted on each side of the tractor; a ridge breaker plate being disposed ahead of the front end of each track.

The desired vertical clearance of each plate 8 from the ground level is then obtained as heretofore described and each plate is disposed in the operative position shown in Fig. 1.

As the tractor moves forward, each plate as it encounters a ridge or check cuts thru the same and forms a horizontal path thru which the track may pass.

If the tractor is reversed for any reason the plates 8 do not dig into the ground but merely swing or pivot on bolts 10 and remain on top of the ground. This prevents the plates from digging in and possibly stalling the tractor.

When not in use or when the tractor is being driven onto a transporting trailer, each plate 8 is moved to a horizontal position which brings hole 14 into register with one of the holes 15 and bolts 16 are then placed thru the holes and secured in place by nuts threaded thereon. Due to the fact that hole 14 will register with one of holes 15 regardless of the vertical adjustment of plate 8 the plate may be locked in horizontal position with a minimum of effort.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A ridge breaker for a tractor having a ground engaging track, comprising a pair of spaced arms adapted for attachment to the tractor adjacent the ground engaging track and to project ahead of same on opposite sides thereof, a ridge breaker plate, spaced flanges formed on and extending rearwardly from the plate, said flanges having a vertical row of holes formed therein; the arms at their forward end having a hole formed therein to selectively register with corresponding holes in the flanges, bolts extending thru corresponding holes in the flanges and the adjacent holes in the arms, a projecting ear formed on one of said flanges, said ear having a hole formed therein, the adjacent arm having a row of holes formed therein and one of which will register with the hole in the ear when the plate is raised to a substantially horizontal position and regardless of the vertical adjustment thereof, and a bolt for engagement in matching holes.

2. A ridge breaker for a tractor having a ground engaging track, comprising a pair of spaced arms adapted for attachment to the tractor adjacent the ground engaging track and to project ahead of same on opposite sides thereof, a ridge breaker plate, spaced flanges formed on and extending rearwardly from the plate, said flanges being pivoted on the forward ends of the arms, an ear projecting from one of said flanges, the adjacent arm having a hole therein which registers with the hole in the ear when the plate is raised to a substantially horizontal position, and a bolt for engagement in said matching holes.

3. A ridge breaker for a tractor having a ground engaging track comprising a pair of spaced arms adapted for attachment to a tractor adjacent the ground engaging tracks and to project a head of the same on opposite sides thereof, said arms having relatively long front edges, a ridge breaker plate disposed ahead of the arms and normally engaging against the front edges thereof, and means pivoting the plate on the arms in a plane adjacent the upper edges of the arms, said relatively long front edges of the arms being effective to prevent rearward buckling of the breaker plate.

FRED W. HINTZ.